(12) United States Patent
Van Den Berg et al.

(10) Patent No.: US 8,540,821 B2
(45) Date of Patent: Sep. 24, 2013

(54) TEAT CUP CLEANING DEVICE AND METHOD

(75) Inventors: Karel Van Den Berg, Bleskensgraaf (NL); Gerard Mostert, Schipluiden (NL)

(73) Assignee: Maasland N.V., Maassluis (NL)

(*) Notice: Subject to any disclaimer, the term of this patent is extended or adjusted under 35 U.S.C. 154(b) by 91 days.

(21) Appl. No.: 12/971,048

(22) Filed: Dec. 17, 2010

(65) Prior Publication Data

US 2011/0083700 A1 Apr. 14, 2011

Related U.S. Application Data

(63) Continuation-in-part of application No. 11/962,137, filed on Dec. 21, 2007, now abandoned, which is a continuation-in-part of application No. 11/087,631, filed on Mar. 24, 2005, now abandoned.

(30) Foreign Application Priority Data

| Mar. 26, 2004 | (NL) | ................................. | 1025819 |
| Dec. 21, 2006 | (NL) | ................................. | 1033100 |
| May 24, 2007 | (NL) | ................................. | 1033883 |

(51) Int. Cl.
*B08B 9/20* (2006.01)
*B08B 3/08* (2006.01)
*B08B 3/10* (2006.01)
*A61L 2/18* (2006.01)

(52) U.S. Cl.
USPC ........... 134/22.18; 134/22.1; 134/34; 134/35; 134/166 R; 422/28

(58) Field of Classification Search
USPC ............................. 134/19, 22.18, 105, 166 R
See application file for complete search history.

(56) References Cited

U.S. PATENT DOCUMENTS

| 2,228,520 A | 1/1941 | Hodsdon |
| 2,616,809 A | 11/1952 | Graves |

(Continued)

FOREIGN PATENT DOCUMENTS

| CH | 368009 | 4/1963 |
| EP | 0385539 A2 | 9/1990 |

(Continued)

OTHER PUBLICATIONS

Practical Research Cattle, Sheep and Horses (PR) Dairy production ("Melkwinning"), Handbook, M.C. Van der Haven, C.J.A.M. de Koning, H. Wemmenhove, R. Westerbeek, Aug. 1996 (with translation).

*Primary Examiner* — Michael Kornakov
*Assistant Examiner* — Natasha Campbell
(74) *Attorney, Agent, or Firm* — Hoyng Monegier LLP; Coraline J. Haitjema; David P. Owen

(57) ABSTRACT

A teat cup cleaning device comprises a heating chamber provided with a discharge outlet that is closable by a valve and arranged for connection to a teat cup. A filling device is arranged for filling the heating chamber with an amount of cleaning liquid and retaining a given quantity of gas. The chamber is provided with a heating arrangement arranged to heat the contents of the heating chamber to a temperature T higher than the boiling point Tk of the cleaning liquid at ambient pressure. On operation of the valve superheated cleaning liquid is discharged to clean a teat cup.

23 Claims, 3 Drawing Sheets

(56) References Cited

U.S. PATENT DOCUMENTS

| | | |
|---|---|---|
| 3,916,923 A | 11/1975 | Branton |
| 4,222,346 A | 9/1980 | Reisgies |
| 4,870,989 A | 10/1989 | Bickford |
| RE33,391 E | 10/1990 | Breton |
| 5,167,201 A | 12/1992 | Peles |
| 5,881,669 A | 3/1999 | Van den Berg |
| 5,967,081 A | 10/1999 | Street |
| 6,089,242 A | 7/2000 | Buck |
| 6,118,933 A | 9/2000 | Roberson |
| 6,463,877 B1 | 10/2002 | Van der Lely |
| 6,598,560 B1 | 7/2003 | Van den Berg |
| 6,619,227 B1 | 9/2003 | Berger |
| 2002/0152962 A1 | 10/2002 | Fransen |
| 2003/0019431 A1 | 1/2003 | Van den Berg |
| 2003/0188688 A1 | 10/2003 | Berger |
| 2005/0126499 A1 | 6/2005 | Ericsson |
| 2005/0211173 A1* | 9/2005 | Fransen et al. ............. 119/14.02 |
| 2006/0237041 A1* | 10/2006 | Morden ..................... 134/22.12 |

FOREIGN PATENT DOCUMENTS

| | | |
|---|---|---|
| EP | 1186229 A2 | 3/2002 |
| EP | 1234496 A2 | 8/2002 |
| EP | 1279329 A2 | 1/2003 |
| EP | 1388281 A1 | 2/2004 |
| GB | 447629 | 5/1936 |
| GB | 629017 A | 9/1949 |
| GB | 911701 | 11/1962 |
| JP | 07116616 A | 5/1995 |
| WO | 03077645 A1 | 9/2003 |
| WO | 2004004791 A1 | 1/2004 |

* cited by examiner

US 8,540,821 B2

TEAT CUP CLEANING DEVICE AND METHOD

CROSS REFERENCE TO RELATED APPLICATIONS

This application is a continuation-in-part of Ser. No. 11/962,137 filed on Dec. 21, 2007, which claims priority to Dutch application number 1033100 filed on 21 Dec. 2006 as well as Dutch application number 1033883 filed on 24 May 2007; this application is also a continuation in part of 11/087,631 filed on Mar. 24, 2005, which claims priority from Dutch patent application 1025819 filed on 26 Mar. 2004, the contents of all aforementioned applications are hereby incorporated by reference in their entirety.

BACKGROUND OF THE INVENTION

1. Field of the Invention

The invention relates to devices for milking dairy animals and in particular to devices provided with disinfecting means for supplying disinfecting fluids to parts of the device. The invention further relates to methods of milking dairy animals including the performing of such disinfecting procedures. More particularly it relates to teat cup cleaning devices of the type comprising a heating chamber, provided with a discharge outlet, closable by means of a valve, and arranged for connection to a teat cup for high temperature cleaning.

2. Description of the Related Art

Devices for milking dairy animals are known in which, in the context of disinfection, steam is applied that is sufficiently hot for heating at least a part of a teat liner and/or teat cup to a temperature at which micro-organisms and bacteria are killed or eliminated. The disinfection and/or sterilisation should preferably comprise the whole inner part of a teat liner. The known cleaning methods consist of the steps of: removing milk or other residues that are present on at least the teat liner by means of a cleaning fluid; removing the cleaning fluid, and disinfecting at least a part of the teat liner with steam. Applying both a cleaning fluid and a disinfecting fluid for cleaning, respectively disinfecting a teat liner implies a relatively large consumption of fluids and energy.

Such a device and method of milking a dairy animal are known for instance from PCT patent application WO 03/077645. According to one embodiment of WO 03/077645 there is provided a chamber which is closable by means of a pressure-controlled valve and which is provided with heating means. The valve opens at a selected overpressure, and remains open until the pressure has dropped to about atmospheric pressure. In this manner a puff or blow of vapor may be obtained. A water tank provides a constant flow velocity of water to the chamber via a non-return valve. A drawback of the known device is that even a strong steam jet has a limited cleaning/disinfecting power, often insufficient for cleaning and/or disinfecting a teat cup in a reliable manner. Furthermore, the known device is unable to supply water to the teat cup while the chamber is being heated to produce steam. There is thus a particular need for a device and method providing a more reliable cleaning and/or disinfecting action. It would be furthermore desirable to provide a device in which water could be supplied to the teat cup even during steam preparation.

BRIEF SUMMARY OF THE INVENTION

The present invention addresses these problems by providing a device having a pressurizable heating chamber having a discharge outlet closable by means of a valve, the discharge outlet being arranged for connection to at least one teat cup, a filling device for filling the heating chamber with an amount of cleaning liquid, a gas retention arrangement for maintaining a predetermined quantity of gas within the heating chamber on filling the heating chamber with the amount of cleaning liquid, a heating arrangement for heating the contents of the heating chamber to a predetermined condition having a temperature T higher than a boiling point Tk of the cleaning liquid at ambient pressure and a valve controlling element, arranged to open the valve. In this manner, the chamber is arranged to contain a specific amount of cleaning liquid in the liquid state and a specific amount of gas at the moment of opening the valve of the discharge outlet. On opening the valve, the pressure in the heating chamber will fall to the ambient pressure, in which case an amount of vapor present will escape. Since the cleaning liquid is a superheated liquid at that lower pressure, it will start to boil suddenly and with great force. The vapor bubbles formed will carry at least a part of the liquid out through the discharge outlet. In fact, not only vapor but a vapor-liquid mixture is discharged. By virtue of the much higher density of liquid, the total heat content of the vapor-liquid mixture is much higher than the heat content of vapor alone, so that also the cleaning and/or disinfecting action will be increased considerably. Of greatest significance, the presence of a predetermined volume of gas in the chamber prior to heating allows greater control of the resulting mixture to be discharged. Furthermore, by ensuring a certain amount of gas in the chamber, premature discharge is avoided. In the present context, it will be understood that reference to gas is intended to refer to any non-liquid fluid phase. This may comprise air, water vapor, cleaning fluid vapors or mixtures thereof.

In one embodiment of the invention the heating chamber may also be filled via part of the discharge outlet. Such an arrangement can be advantageous in allowing a bypass of the heating chamber such that a teat cup may be rinsed with cleaning liquid via part of the discharge outlet while the heating chamber is being filled or is undergoing heating. It is alternatively possible to provide a separate supply to the heating chamber which should then preferably be closable as well, for example by means of a valve.

The discharge may be arranged for connection to a teat cup. Alternatively, the heating chamber as a whole may be arranged for connection to the teat cup. In that case the discharge outlet should be provided in such a way that it is possible for the heated contents to reach the teat cup. The discharge outlet or the heating chamber may, for example, comprise a teat cup gripping element such as one or more clamps. It is noted in this context that connection should be understood in a wider sense, and comprises the situation that the teat cup(s) is/are placed in a position enabling them to be cleaned in an efficient manner by means of the device. For example, there may be left an interspace between the teat cup and the teat cup cleaning device. This is in particular the case if an outer side of the teat cup has to be cleaned, but may also occur upon cleaning the inner side of a teat cup. In the latter case, however, it is advantageous to connect the teat cup in a sealing manner to the teat cup cleaning device. In this case, it may also be advantageous to provide a discharge of contents of the teat cup, such as by means of a milk vacuum connection.

In addition, it is in particular possible to arrange the discharge or the entire heating chamber for connection to and cleaning of a plurality of teat cups, for example by providing a corresponding number of teat cup gripping means, and/or by dividing the discharge into a corresponding number of separate sub-discharges. An embodiment arranged in such a way may save time during cleaning, but may require a higher total power.

The heating arrangement may comprise in principle any known heating device. Examples are burners, immersion heaters or other electric heating devices, microwave radiators, etc. In practice, electric heating arrangements will often be preferred because of their user-friendliness and high efficiency.

In a particular embodiment of the invention, the gas retention arrangement is arranged to ensure that between 3% and 90% by volume of gas is retained within the chamber when initially filled and prior to heating. Preferably at least 50%, more preferably at least 90% of cleaning liquid is present in the heating chamber when initially filled. Preferably, the degree of filling of the heating chamber may be adjustable to set the amount of vapor-liquid mixture supplied, and thus the total heat content thereof. The device may thus be adapted to different cleaning requirements.

The temperature range for attaining a complete disinfection of at least a part of the teat liners, in which the causers of udder diseases and udder infections are killed, lies approximately between 100° C. and 180° C. In view of inter alia the fact that a disinfection that eliminates causers of udder diseases and udder infections is in principle adequate, and in view of the thermal loadability of a teat liner and the intensive elastic deformations of a teat liner under operating conditions, a range between 100° C. and 150° C. may be chosen as a practical, active temperature range for steam disinfection of at least a part of the teat liners. Additionally, it is pointed out that steam is only one of a plurality of disinfecting fluids that can be taken into consideration.

In a particular embodiment, the temperature T amounts to at least 130° C., more preferably to at least 160° C. At a higher temperature, not only the heat content will be greater, but also the (equilibrium) vapor pressure will be higher and, as a result thereof, the difference from the ambient pressure will be greater. Upon opening of the heating chamber, the greater pressure difference will also lead to more violent boiling, so that the contents of the heating chamber will, moreover, be emitted in a more energetic manner.

In another embodiment, the valve according to the present invention comprises a pressure-relief valve. This is a simple type of valve which can be set to open at a particular pressure, for example independently of the type of cleaning liquid. In fact, it is the pressure difference over ambient pressure that is relevant, but the latter will not generally vary more than 2-3%.

In one embodiment, an opening overpressure OD of the pressure-relief valve may amounts to at least 2 bar absolute pressure. At this value there is already obtained a satisfactory cleaning action. The opening overpressure OD is preferably set to at least 8 bar absolute pressure. At such a value, in most cases there is achieved a very good cleaning and also a very good disinfection. It is pointed out that the mentioned overpressures are to a certain extent connected with the amount of cleaning liquid that is heated in the heating chamber. A small amount will have to be heated to a higher pressure in order to have sufficient heat content. In practice, overpressure and amount may be adapted to each other.

In another embodiment, the valve controlling element provides the possibility of adapting the conditions in which the valve opens to the cleaning wishes in a very simple manner. For example, if a teat cup is contaminated to a great extent or should be disinfected, more heat content is needed than in the case of teat cups that are not or hardly contaminated. In that case, it is not only possible to adapt the amount of cleaning liquid, but also the heating condition. In particular, the valve controlling element is arranged to open the valve at one of a temperature OT or a pressure OD, preferably an adjustable temperature OT or an adjustable pressure OD, in the heating chamber. The heat content of the cleaning liquid to be emitted can thus be controlled in a very flexible manner. The various ways of controlling the disinfection process according to the present invention are described in further detail hereinafter.

In one embodiment, by control with the aid of temperature measuring devices and feed back regulation of a heating chamber for heating a disinfecting fluid, the temperature mentioned, or another desired temperature, will be achieved. Registering values of at least one control parameter for the control unit is indispensable for a proper control of the actions performed during disinfecting.

Therefore, an embodiment of a method according to the invention comprises the step of registering values of at least one control parameter for the teat cup cleaning device. Control parameters are those parameters by which a disinfection treatment is determined, such as, for example, the duration of operation of the disinfection, the amount of steam, the rate of flow of the steam, the pressure of the steam, etc. Various control parameters are discussed in further detail hereinafter.

In an embodiment of a method according to the invention, the fluid contains a chemical cleaning substance. In another embodiment, the cleaning liquid comprises water, in particular substantially water. In this context water may be understood to be water as available for consumption, rain or recycled water or distilled/demineralised water. Water constitutes a very useful cleaning and disinfecting liquid because of its very great heat content, its sufficiently high temperature as a vapor and its great availability in its pure form at a low price. However, other cleaning liquids or additives are not excluded.

In particular, the cleaning liquid comprises a disinfecting agent, for example an acid. Addition of a disinfecting agent may still reinforce the disinfecting action. In special cases, the cleaning liquid comprises substantially the disinfecting agent, in particular if the latter is liquid and can be supplied as vapor or a vapor/liquid mixture.

In a particular embodiment, the device forms part of a milking implement comprising a cleaning liquid storage container which is connectable to the heating chamber, preferably by means of a second valve. The milking implement may thus be self-supporting, which may be of great advantage, for example in the case of an independent or even a self-propelled milking implement. The cleaning liquid storage container may, for example, comprise a tank, such as, for example, in the form of a low-pressure boiler known per se. There may also be provided a plurality of storage containers, each containing a desired cleaning liquid. A storage container also provides the possibility of performing a pre-treatment on the cleaning liquid, such as pre-heating. It is also possible not to provide a storage container but instead to provide a connection, in each case according to the situation, for example by means of a hose, a connection to an external storage container, a water supply pipe or the like.

In cases where a storage container is provided, it may be disposed over the heating chamber, so that the gravitational force will act as driving force. Alternatively, a pumping means or the like may be provided in the storage container, or in a further external storage container.

The gas retention arrangement may operate in combination with the filling device to control a controllable filling or secondary valve in order to control the amount of cleaning liquid admitted. Alternatively, it may be arranged to control the valve of the heating chamber. It is also understood in the context of the invention that for a chamber of fixed volume, the volume of gas retained will be directly related to the volume of cleaning liquid supplied to the chamber. It may thus suffice to determine the amount of cleaning liquid supplied to the chamber. In order to determine this amount, the gas retention arrangement may comprise, for example, a flow meter, a filling chamber having an adjustable volume, a level detector or with any other auxiliary means known in the state of the start and suitable for the purpose. In an alternative arrangement, the gas retention arrangement may comprise a physical form of the chamber or valve in order to ensure that a predetermined quantity of gas is retained. This physical form may be in the nature of an air lock or the like. In a preferred embodiment it comprises a cavity formed at an underside of the discharge or inlet valve.

In certain preferred embodiments, the device comprises a direct connection, or a bypass, between a liquid supply and the discharge outlet. As mentioned above, this offers the advantage that it is then possible for the device to direct e.g. cooling liquid to the discharge outlet. This may be used for example for the purpose of cooling a teat cup after the latter has been cleaned with hot cleaning liquid, without this cool liquid cooling the heating chamber. Cooling the heating chamber is not necessary and is generally undesirable as it requires further energy. The direct connection may be, for example, a separate line which is advantageously closable. The liquid may then be constituted by a separate cooling liquid, or a non-heated cleaning liquid or the like.

Alternatively, there is provided a direct connection which has itself a branch to the heating chamber, for example via an aperture that is advantageously closable by means of a valve or the like. This means that the heating chamber can be filled with new cleaning liquid via that aperture and, if desired, via the valve, during, or more advantageously prior to, cooling a teat cup and the like. Such a valve may, again advantageously, be the same as the controllable valve that is capable of closing the discharge.

If desired, the valve may have a floating action that is advantageously adjustable in height. If the heating chamber is sufficiently filled, the floating valve will close the heating chamber, and it will be possible to use the remaining liquid for cooling purposes. It will be obvious that, in this case, the liquid will comprise substantially cleaning liquid.

The heating arrangement may advantageously have an adjustable heating power. This adjustability may be switched on and off in a simple manner, but the effective heating power is advantageously adjustable to two or more different positions with heating power unequal to zero and is more advantageously continuously adjustable. This may, for example, provide advantages if the amount of cleaning liquid to be heated varies. Heating of a small amount of liquid is better controllable with a lower heating power.

As the effective power of the heating arrangement may vary, for example by (mains) voltage fluctuations in the case of electric heating means, there is advantageously provided a power correcting device that is connected to the heating means. The power correcting device comprises, for example, a power stabilizer, such as a voltage corrector, or an energy meter.

In a particular embodiment, the heating arrangement comprises a control device which is arranged to control the heating arrangement in such a way that the predetermined condition is not reached until the moment of desired use. For a valve controlling element of the type set to open at the predetermined condition this will result in the valve remaining closed. This means that the heating arrangement may control the heating condition of the contents of the heating chamber in such a way that the condition in which the valve of the discharge would open is not reached, that is to say that the pressure in the heating chamber remains below the opening overpressure OD, or a corresponding temperature in the heating chamber is kept below the temperature T, the equilibrium vapor pressure being equal to OD. This provides the advantage that the teat cup cleaning device is always ready for cleaning a teat cup almost immediately, as soon as the latter is connected or otherwise offered for cleaning. This control device may moreover be integrated with other control elements or circuits, such as the valve controlling element and a controller for the gas retention arrangement and filling device. The control device (also known as the control unit) is discussed in further detail below.

In certain embodiments, the control device is arranged to switch on the heating arrangement during a desired period of time. Preferably, the desired period of time is adjustable, for example in dependence on the amount or sort of cleaning liquid to be heated, or the desired temperature. If desired, the control device may, advantageously, moreover be arranged to open subsequently the controllable valve.

Advantageously, the discharge outlet comprises a discharge duct projecting over a distance L beyond a wall of the chamber, wherein L is at most equal to the internal depth of the teat cup to be cleaned. By means of such a discharge duct it is possible to clean the interior of the teat cup in a particularly efficient manner. The discharge duct may comprises at least one aperture, for example at its end, but preferably one or more apertures in a side wall thereof. Such an embodiment is, of course, also suitable for cleaning the exterior of the teat cup.

Other embodiments of the discharge outlet are also possible. For example, the invention also provides a device wherein the discharge outlet comprises a closable aperture in a wall of the heating chamber. In this case, the teat cup may be disposed against that wall around the aperture of the discharge outlet. An additional advantage may be that the upper side of the teat cup will also be disinfected at least to some extent by means of contact with the (hot) wall.

In a particular teat cup cleaning device according to the invention, the valve is controllable by a teat cup to be cleaned. For this purpose the device comprises, for example, an opening mechanism, in the form of a spring mechanism, a push button, a sensor or the like. It is also possible to provide a separate control mechanism, such as a manual control mechanism.

The invention also provides a method of cleaning a teat cup, comprising providing a pressurizable heating chamber having a discharge outlet closable by a valve, the discharge outlet being arranged for connection to at least one teat cup, supplying an amount of cleaning liquid to the pressurizable heating chamber sufficient to maintain a predetermined quantity of gas within the heating chamber, closing the heating chamber, heating the cleaning liquid in the heating chamber to a condition with a temperature T that is higher than a boiling point Tk of the cleaning liquid at ambient pressure, opening the valve at the condition and directing the heated contents of the heating chamber via the discharge outlet into a teat cup. The method substantially corresponds to the application of the device according to the invention, and, therefore, the advantages of the method will not be set out again in further detail. However, it is pointed out that for applying the method it is not necessary to provide a filling device. It is also possible, for example, to fill an amount of cleaning liquid manually.

In particular, the amount of cleaning liquid or the predetermined amount of gas is chosen in such a way that between 3% and 90% of gas is retained prior to heating. More preferably, between 50% and 90% cleaning liquid is provided in the chamber.

Preferably, the cleaning liquid is water as defined above. Alternatively, it may comprise a disinfecting agent, for example an acid.

Further, the method comprises opening the valve at an adjustable threshold value of a parameter, in particular temperature or pressure. It will be understood that the threshold may also be determined in terms of the energy content of the chamber. By means of this, the opening characteristic can be chosen in an efficient manner so that the cleaning characteristic can be chosen as well. The parameter can be chosen from many suitable parameters, of which some favorable embodiments will be provided below. Preferably the threshold value is an overpressure OD in the heating chamber and, as the threshold value OD, at least 1 bar above ambient pressure, preferably at least 8 bar above ambient pressure, is set. Alternatively, the threshold value is a temperature OT in the heating chamber and, as the threshold value OT, at least 130° C., more preferably at least 160° C., is set.

According to an important aspect of the method, it is advantageous to subsequently cool a teat cup after cleaning with hot cleaning liquid, by means of a cooling liquid that is also supplied via the discharge outlet or, if desired, via a separate discharge. In particular when using a device having a bypass for liquid supply, this may take place in a single procedure. In that case as little heat as possible, in particular of the still hot heating chamber, will be lost. This cooling is further discussed hereinafter.

According to another aspect of the method, the heating chamber may be cleaned by filling it with a cleaning liquid and, if desired, by keeping the liquid in the heating chamber during a predetermined period of time, in order to enable it to perform a profound cleaning action, and by subsequently discharging the liquid via the discharge. The latter may take place advantageously by heating also this liquid to above its boiling point at ambient pressure. The liquid will then be removed, again in the case of opening the discharge, by means of a vapor jet.

In an embodiment of a method according to the invention, the method comprises the step of controlling, with the aid of a desired teat liner temperature of the part of a teat liner that is in contact with the steam, the heating device for heating the steam in such a way that at least the part of the teat liner that is in contact with the steam is capable of being heated to the desired teat liner temperature. It will be appreciated in the following embodiments the teat cup may instead be the teat cup.

In an embodiment of a method according to the invention, the method comprises the step of comparing the measured temperature with the desired temperature, the step of generating a comparison signal that is indicative of the comparison result, the step of supplying the comparison signal to the control unit, and the step of controlling, with the aid of said comparison signal, the heating device by the control unit in such a way that the desired temperature is attainable.

In an embodiment of a method according to the invention, the milking device also being provided with a detection device for detecting physical and/or chemical abnormalities in milk secreted by a dairy animal, the method comprises the step of controlling the teat cup cleaning device with the aid of data from the detection device.

In an embodiment of a method according to the invention, the method comprises the step of automatically connecting a teat cup to a teat of a dairy animal by means of a robot arm.

In an embodiment of a method according to the invention, the method comprises the step of controlling the robot arm for automatically connecting a teat cup to a teat of a dairy animal when a parameter value comes below an adjustable threshold value for the second temperature signal and the teat cup cleaning device is out of operation.

In an embodiment of a method according to the invention, the threshold value for the second temperature signal is approximately 40° C.

In an embodiment of a method according to the invention, the teat cup comprising a teat receiving aperture and a milk discharge aperture and the milk discharge aperture being in connection with a foremilk discharge device, the method comprises the step of displacing the steam in a direction from the teat receiving aperture to the milk discharge aperture in such a way that the steam gets into the foremilk discharge device.

In an embodiment of a method according to the invention, the method comprises the step of moving the teat cup in a pulsating manner when the steam is being brought into contact with at least the teat liner.

A further method according to the invention is a method of milking a dairy animal which comprises the step of disinfecting at least a part of a teat cup by heating the teat cup, the disinfection being performed by a teat cup cleaning device that is controlled by a control unit, the teat cup is heated directly, and at least a part of the teat cup attains a temperature of at least 160° C.

In an embodiment of a method according to the invention, the last method comprises the step of registering values of at least one control parameter for the teat cup cleaning device.

In an embodiment of a method according to the invention, the milking device comprising a teat cup cleaning device with a heating device for heating water to steam, the teat cup cleaning device being suitable for bringing the steam into contact with a teat liner, and the milking device comprising a control unit which is suitable for controlling the teat cup cleaning device, the method comprises the step of controlling the teat cup cleaning device with the aid of a first regulation parameter. For example, the controlling can be done by a control unit In an embodiment of a method according to the invention, the first regulation parameter is a control parameter.

In an embodiment of a method according to the invention, the method comprises the step of registering values of at least one control parameter for the teat cup cleaning device.

In an embodiment of a method according to the invention, the control parameter is time-dependent.

In an embodiment of a method according to the invention, the control parameter is the duration of operation, and the method comprises the step of putting the teat cup cleaning device into operation by the control unit.

In an embodiment of a method according to the invention, the control parameter is the amount of steam, and the method comprises the step of putting the teat cup cleaning device into operation by the control unit.

In an embodiment of a method according to the invention, the method comprises the step of putting the teat cup cleaning device out of operation by the control unit when a threshold value is exceeded.

In an embodiment of a method according to the invention, the threshold value is an adjustable threshold value.

In an embodiment of a method according to the invention, the threshold value amounts to between approximately 2 and approximately 5 minutes.

In an embodiment of a method according to the invention, the method comprises the step of releasing the steam by a release device, the step of putting the release device into operation, and the step of putting the release device out of operation when a threshold value is exceeded.

In an embodiment of a method according to the invention, the threshold value amounts to between approximately 3 and approximately 15 seconds.

In an embodiment of a method according to the invention, the method comprises the step of determining the identity of an animal, and the step of controlling the teat cup cleaning device partially with the aid of the determined animal identity.

In an embodiment of a method according to the invention, the method comprises the step of actively cooling at least a part of the teat liner.

In an embodiment of a method according to the invention, the method comprises the step of controlling the teat cup cleaning device with the aid of a second regulation parameter.

In an embodiment of a method according to the invention, the second regulation parameter is an adjustable threshold value.

In an embodiment of a method according to the invention, the second regulation parameter has an animal-dependent value.

In an embodiment of a method according to the invention, the method comprises the step of measuring the temperature of the steam that is in contact with at least a part of the teat liner, the step of generating a first temperature signal that is indicative of the measured steam temperature, and the step of supplying the first temperature signal to the control unit.

In an embodiment of a method according to the invention, the method comprises the step of measuring the temperature of at least a part of the teat liner, the step of generating a second temperature signal that is indicative of the measured teat cup temperature, and the step of supplying the second temperature signal to the control unit.

In an embodiment of a method according to the invention, the teat cup being made of elastic material, the method comprises the step of measuring a displacing behaviour of at least a part of the teat liner.

In an embodiment of a method according to the invention, the teat cup comprising a teat receiving aperture and a milk discharge aperture, the method comprises the step of displacing the temperature measuring member to a position above the teat receiving aperture of a teat liner.

In an embodiment of a method according to the invention, the teat cup comprising a teat receiving space for receiving a teat of a dairy animal, the teat receiving space being the space in a teat cup between the teat receiving aperture and the milk discharge aperture of a teat liner, the method comprises the step of inserting the temperature measuring member into the teat receiving space of a teat liner.

In an embodiment of a method according to the invention, the temperature measuring member is an infrared sensor or an air flow sensor.

In an embodiment of a method according to the invention, the method comprises the step of controlling, with the aid of a desired steam temperature of the steam that is in contact with the teat liner, the heating device for heating the steam in such a way that the steam that is in contact with at least a part of the teat cup is capable of being heated to the desired steam temperature.

In an embodiment of a method according to the invention, the method comprises the step of controlling, with the aid of a desired teat cup temperature of the part of a teat cup that is in contact with the steam, the heating device for heating the steam in such a way that at least the part of the teat cup that is in contact with the steam is capable of being heated to the desired teat cup temperature.

In an embodiment of a method according to the invention, the method comprises the step of comparing the measured temperature with the desired temperature, the step of generating a comparison signal that is indicative of the comparison result, the step of supplying the comparison signal to the control unit, and the step of controlling, with the aid of said comparison signal, the heating device by the control unit in such a way that the desired temperature is attainable.

In an embodiment of a method according to the invention, the milking device also being provided with a detection device for detecting physical and/or chemical abnormalities in milk secreted by a dairy animal, the method comprises the step of controlling the teat cup cleaning device with the aid of data from the detection device.

In an embodiment of a method according to the invention, the method comprises the step of automatically connecting a teat cup to a teat of a dairy animal by means of a robot arm.

In an embodiment of a method according to the invention, the method comprises the step of controlling the robot arm for automatically connecting a teat cup to a teat of a dairy animal when a parameter value comes below an adjustable threshold value for the second temperature signal and the teat cup cleaning device is out of operation.

In an embodiment of a method according to the invention, the threshold value for the second temperature signal is approximately 40° C.

In an embodiment of a method according to the invention, the teat cup comprising a teat receiving aperture and a milk discharge aperture and the milk discharge aperture being in connection with a foremilk discharge device, the method comprises the step of displacing the steam in a direction from the teat receiving aperture to the milk discharge aperture in such a way that the steam gets into the foremilk discharge device.

In an embodiment of a method according to the invention, the method comprises the step of moving the teat cup in a pulsating manner when the steam is being brought into contact with at least the teat liner.

In an embodiment of a device according to the invention, the control unit that controls the teat cup cleaning device is suitable for controlling the teat cup cleaning device with the aid of a first regulation parameter. As a first regulation parameter for controlling the teat cup cleaning device a control parameter may be chosen. By registering values of at least one control parameter and controlling the teat cup cleaning device with the aid of these control parameter values, feedback regulation of disinfection process parameters is possible. There is thus obtained a firmer grip on a correct performance of the disinfection procedure.

In an embodiment of a device according to the invention, the control parameter is time-dependent.

In an embodiment of a device according to the invention, the control unit is suitable for putting the teat cup cleaning device into operation and the control parameter is a time-dependent parameter, such as, for example, the duration of operation. The amount of released steam may also be chosen as a control parameter.

In an embodiment of a device according to the invention, the control unit is suitable for putting the teat cup cleaning device out of operation when a threshold value is exceeded. This threshold value may be an adjustable threshold value. In the case that the milking system and in particular the teat liners are cleaned with water, a mix of water and air, or water with a chemical cleaning substance added thereto, a threshold value in the range between approximately 2 and 5 minutes may be chosen.

In an embodiment of a device according to the invention, the teat cup cleaning device comprises a release device (can also be known as a discharge outlet) for releasing the steam, the control unit being suitable for putting the release device into operation and for putting the release device out of operation when a threshold value is exceeded. By registering values of at least one control parameter and by putting the release device of the teat cup cleaning device out of operation when it is established that a threshold value is exceeded, a proper protection against thermal overload of the teat liners is achieved. Putting the release device out of operation in time is absolutely necessary from a point of view of security. Also from an environmental point of view it is desirable that the release device is put out of operation in time.

In an embodiment of a device according to the invention, the threshold value at which the release device is put out of operation has a time-dependent value, in particular a span of time. When applying steam as a disinfecting fluid, the threshold value can be between approximately 3 seconds and approximately 15 seconds; when applying water and chemical substances, a threshold value of approximately 1 minute can be taken into consideration.

In an embodiment of a device according to the invention, the milking device comprises an animal identification system for determining the identity of an animal and for supplying an animal identification signal to the control unit, the control unit controlling the disinfection at least partially with the aid of the animal identification signal. An animal related disinfection and/or cleaning treatment of at least a part of the teat cup is thus possible.

In an embodiment of a device according to the invention, the teat cup cleaning device of the milking device comprises a cooling device for actively cooling at least a part of the teat liner. After having been exposed to a hot disinfecting fluid, a teat cup has to be cooled before it is possible to connect the teat cup again to a teat of a dairy animal. In an embodiment of a device according to the invention, the cooling device comprises a vacuum pump, but it is also possible to effect an adequate cooling with compressed air or water. In an embodiment of a device according to the invention, there are provided technical means for applying the aforementioned fluids. The cooling device is capable of being controlled by the control unit, partially by the possibility of inputting a regulation parameter value for the cooling device. This regulation parameter value may be, for example, a span of time during which cooling has to take place, a desired final cooling temperature, etc. The cooling intensity is thus inputted.

In an embodiment of a device according to the invention, the control unit comprises an input device for inputting a second regulation parameter for controlling the disinfection. Said second regulation parameter may relate, for example, to an adjustable threshold value or an animal-dependent value. The second regulation parameter can be a control parameter of the disinfection device.

Measuring the temperature of the steam that is in contact with the teat cup is useful or suitable for being able to control the disinfection process. By supplying the measurement data to the control unit it is possible to store these data and to process them for the purpose of feedback regulation of the heating device for the steam. There is thus obtained a closed control loop, which increases the reliability of a successful disinfection to a great extent. In an embodiment of a device according to the invention, the teat cup cleaning device is provided for that purpose with a first temperature measuring member for measuring the temperature of the steam that is in contact with at least a part of the teat liner, for generating a first temperature signal that is indicative of the measured steam temperature and for supplying the first temperature signal to the control unit.

In an embodiment of a device according to the invention, there is a second temperature measuring member for measuring the temperature of at least a part of the teat liner, and for generating a second temperature signal that is indicative of the measured teat cup temperature, and for supplying the second temperature signal to the control unit.

In an embodiment of a device according to the invention, in which the teat liner is made of elastic material, the second temperature measuring member is suitable for measuring a displacing behaviour of at least a part of the teat liner. The mentioned temperature measuring means may be embedded inter alia in a teat liner, and/or be disposed on a teat liner, and/or be disposed on a teat cup, and/or be embedded in a teat cup.

In an embodiment of a device according to the invention, in which the teat cup comprises a teat receiving aperture and a milk discharge aperture, the temperature measuring member is located above the teat receiving aperture of a teat cup or is capable of being displaced to said position. An infrared sensor is one of a plurality of temperature measuring means that may be applied. The temperature measuring member (or temperature measuring means) may be disposed on a robot arm of the milking device. However, the temperature measuring member may be located as well between the disinfection members 13.

A proper measurement of the temperature of the steam that is in contact with the teat cup or the temperature of the teat cup that is in contact with the steam is obtained if the temperature measuring member is located above the teat cup. A possible constructive embodiment of this idea may result in a temperature measuring member that is positioned above the teat liner, in particular the teat receiving aperture, only at the moment of measuring.

In an embodiment of a device according to the invention, in which the teat cup comprises a teat receiving space for receiving a teat of a dairy animal and the teat receiving space is the space in a teat cup between the teat receiving aperture and the milk discharge aperture of a teat liner, the temperature measuring member is capable of being inserted into the teat receiving space of a teat liner. The temperature measuring member, for example an infrared sensor or an air flow sensor, is located for example in or on a disinfecting member that is inserted into a teat cup during the disinfection. Measuring in the immediate vicinity of the teat cup surface increases the reliability of the measurement results. It is pointed out that the infrared sensor and/or air flow sensor can also occupy fixed positions in the teat cup cleaning device.

A temperature feedback control circuit increases the reliability of the achievement of the desired values of the disinfection process parameters. The now following embodiments result from this basic idea. In an embodiment of a device according to the invention, the regulation parameter is a desired steam temperature of the steam that is in contact with the teat liner, and the control unit controls, with the aid of the desired steam temperature, the heating device for heating the steam in such a way that steam that is in contact with the teat cup is capable of being heated to the desired steam temperature.

In an embodiment of a device according to the invention, the regulation parameter is a desired teat cup temperature of the part of a teat cup that is in contact with the steam, and the control unit controls, with the aid of the teat cup temperature, the heating device for heating the steam in such a way that at least the part of the teat cup that is in contact with the steam is capable of being heated to the desired teat cup temperature.

In an embodiment of a device according to the invention, the control unit is provided with a comparing device for comparing the measured temperature with the desired temperature, for generating a comparison signal that is indicative of the comparison result and for supplying the comparison signal to the control unit, the control unit controlling, with the aid of said comparison signal, the heating device in such a way that the desired temperature is attainable.

In an embodiment of a device according to the invention, in which the milking device is also provided with a detection device for detecting physical and/or chemical abnormalities in milk secreted by a dairy animal, the control unit controls the teat cup cleaning device with the aid of data from the detection device. Based on a measured/determined milk quality, the control unit is capable of adjusting the disinfection process in an intelligent manner. If, for example, milk with a high somatic cell count is detected, a longer disinfection time or a larger amount of steam is desirable.

In an embodiment of a device according to the invention, the milking device comprises a robot arm for automatically connecting a teat cup to a teat of a dairy animal.

In an embodiment of a device according to the invention, the robot arm is capable of being controlled by the control unit for automatically connecting a teat cup to a teat of a dairy animal when a parameter value comes below an adjustable threshold value for the second temperature signal and the teat cup cleaning device is out of operation. As a threshold value for the second temperature signal approximately 40° C. may be chosen. As soon as at least a part of a teat cup has attained such a temperature and this has actually been established, the teat cup is suitable for being connected to the teat of a dairy animal. There is thus created a protection against the connection of teat liners having a too high temperature.

In an embodiment of a device according to the invention, the teat cup cleaning device is provided with an additive member for adding an additive. Before the steam exercises its disinfecting action on at least a part of the teat cup of a milking device, an indication substance can be applied in a teat liner. After disinfecting, it is possible by measuring, for example, discoloration of the indication substance, with the aid of technical means, whether the intended disinfection has been successful and/or to what extent all the surfaces to be disinfected have actually been disinfected. It is also possible to add, by means of the additive member, an additional disinfecting substance to the steam just before the moment the steam comes into contact with a teat cup surface. This may be desirable because of chemical reactivity of the steam with the additive. In this context, by indication substance and additive are also meant indication fluids and additional fluids. In an embodiment of a device according to the invention, the additive member is capable of being controlled by the control unit.

In an embodiment of a device according to the invention, in which the teat cup comprises a teat receiving aperture and a milk discharge aperture and the milk discharge aperture is connected to a foremilk discharge device, the teat cup cleaning device is suitable for displacing the steam in a direction from the teat receiving aperture to the milk discharge aperture, in a way in which the steam gets into the milk discharge device. It is thus achieved that the disinfection also comprises the connecting milk line between a teat cup and the foremilk discharge device, and the foremilk discharge device per se. A temperature measuring member at the place where the foremilk discharge device is located measures the temperature of the steam at that place. By feedback of the measured steam temperature to the control unit the heating device of the teat cup cleaning device can be controlled in such a way that a desired steam temperature of the steam in the foremilk discharge device is actually achieved. For this purpose, temperature measuring means may also be included in the aforementioned connecting milk line.

In an embodiment of a device according to the invention, the teat cup cleaning device of the milking device comprises a pulsation device for pulsating at least a part of the teat cup and a control unit for registering values of at least one control parameter for the teat cup cleaning device. Said pulsation device makes it possible to vibrate the teat cup at a high pulsation frequency when a disinfecting fluid or cleaning fluid is being brought into contact with at least a part of the teat liner. The removal of milk and/or other residues on a teat cup surface is promoted in this manner.

BRIEF DESCRIPTION OF THE DRAWINGS

The features and advantages of the invention will be appreciated upon reference to the following drawings of a number of exemplary embodiments, in which.

DESCRIPTION OF ILLUSTRATIVE EMBODIMENTS

Figure 1:
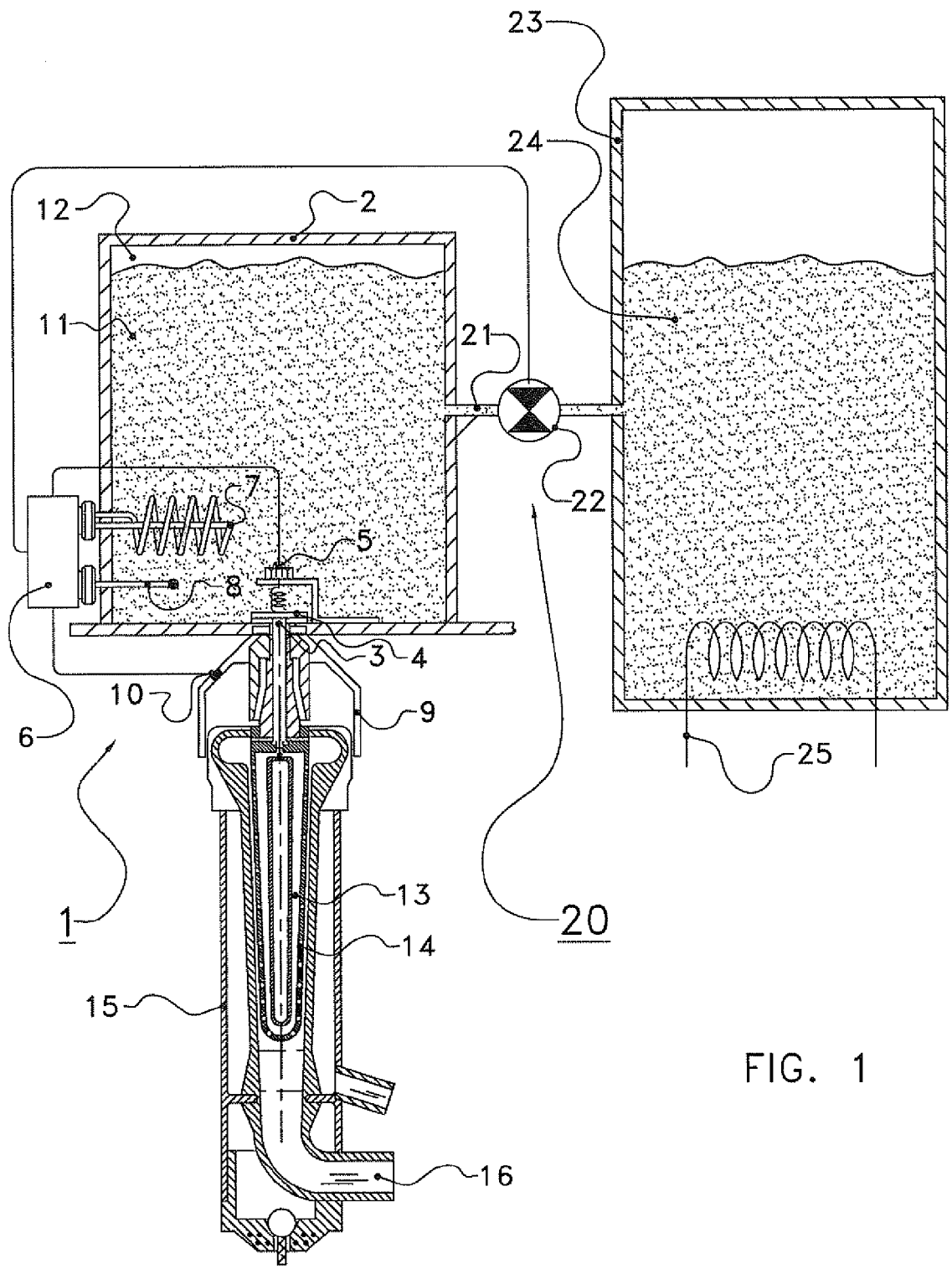
FIG. 1 shows a diagrammatic cross-section of a device according to the invention.

In FIG. 1, the device 1 comprises a heating chamber 2 with a discharge outlet 3 that is closable by means of a valve 4. A valve controlling mechanism 5 is connected to the control unit 6 which is connected itself to a heating coil 7, a thermometer 8 and a proximity sensor 10 in a sealing edge 9.

An amount of cleaning liquid is denoted by 11, and an amount of vapour by 12. A discharge nozzle is denoted by 13 and has apertures 14. A teat cup is denoted by 15 and has a milk discharge 16. A filling device is denoted by 20 and comprises a supply line 21 and a valve/pump 22. There is further shown a storage container 23 with a cleaning liquid stock 24 and an immersion heater 25.

The heating chamber 2 has a wall made of thermally insulating material or be surrounded thereby. Furthermore, the chamber 2 should be able to resist a certain internal pressure and temperature, for which reason it often also comprises a metal housing.

The discharge outlet 3 is closable by means of a valve 4 that is preferably controllable, for example by means of an optional valve control mechanism 5 which may be set, for example, manually or, as shown, by means of a control unit 6. This means that the pressure at which the valve 4 opens is adjustable. The control mechanism may comprise an adjustable spring, be electronically controlled, etc.

The pressure is built up by heating an amount of cleaning liquid 11, often water, by means of a heating coil 7. The heating coil 7 may also be disposed around the heating chamber 2, or in a wall thereof. Other heating means, such as microwave heating etc., may also be applied. The power of the heating coil or the like should be sufficient to bring the contents of the heating chamber 2 to the desired pressure and/or temperature. In practice, it has been found that for providing sterilization to four teat cups, a volume of approximately 50 cm$^3$ heated to a temperature of 220° C. and a pressure of 16-22 bar may be sufficient for adequate sterilizing. Alternatively, a volume of approximately 80 cm$^3$ heated to a temperature of about 180° C. and a pressure of about 10 bar can also provide adequate sterilization. An effective heating coil power of some hundreds of Watts is desirable, depending on the insulation of the chamber and the desired cycle time. The skilled person will be well aware that other temperatures, volumes and pressures may be chosen to achieve the desired cleaning effect, which is largely determined by the total energy transfer from the cleaning liquid to the teat cup.

A sensor 8 may give feedback regarding the temperature or pressure to the control unit 6, which, incidentally, are both optional. The control unit 6 may, for example, control the heating by means of the coil 7 on the basis of a measured temperature. Alternatively the sensor could be disposed in the part of the vapor 12.

For sealing connection of a teat cup 15 there is provided, for example, a sealing edge 9. The latter comprises, for example, a proximity sensor 10 which supplies a signal to the control unit 6 when a teat cup 15 has been connected. At the receipt of such a signal the control unit 6 may order to fill the heating chamber 2, to start the heating, or to open the valve 4. Incidentally, when the teat cup 15 is being positioned, the discharge nozzle 13 will be brought into the teat cup. When the valve 4 opens, the superheated contents will get into the teat cup 15 via the discharge nozzle 13 and through the apertures 14, which ensures an excellent local cleaning or disinfection. A possible overpressure within the teat cup 15 may be discharged in a simple manner via the milk discharge 16, the latter being already provided in the teat cup. Incidentally, the proximity sensor is optional, and the function may also be assumed by the valve 4 itself. For example, the latter may be designed in such a way that it only opens if a teat cup 15 is pressed against it with sufficient force. This is then also a protection against undesired opening of the valve 4.

It is visible in FIG. 1 that the heating chamber 2 is filled for more than 90% with cleaning liquid 11, and with vapor 12 above the liquid. In practice, this offers a favorable amount of heat for the total contents of the heating chamber 2. It is already sufficient per se if, at the moment when the desired temperature/overpressure is reached, cleaning liquid in the liquid state is still present.

Supplying the desired amount of cleaning liquid 11 takes place, for example, manually, or by means of a filling device 20. The latter comprises at least a supply line 21 for filling the heating chamber, which supply line is connectable to a storage container 23, as well as a valve/pump 22. The latter may perform a pumping action if there is insufficient pressure action from the storage container 23. In case of sufficient pressure, a valve will suffice, which valve is controllable, for example, by means of a control device 6. By means of the control device 6 it is then possible to determine in a simple manner how much cleaning liquid is supplied in the heating chamber 2 and how much gas (air or vapor) is retained prior to commencing heating. Appropriate orientation of the supply line 21 and discharge outlet 3 may be chosen to ensure that gas can exit chamber 2 as required. Moreover, it is possible to choose from different cleaning liquids, or, for example, additives, such as disinfecting substances, if, for example, a plurality of storage containers are provided (not shown). In order to facilitate the filling of the heating chamber, there may be provided an air-relief valve (not shown). The cleaning liquid stock 24 may already have been pre-heated by means of the immersion heater 25 or the like, so that an amount concerned in the heating chamber will sooner be at the desired temperature.

Figure 2:
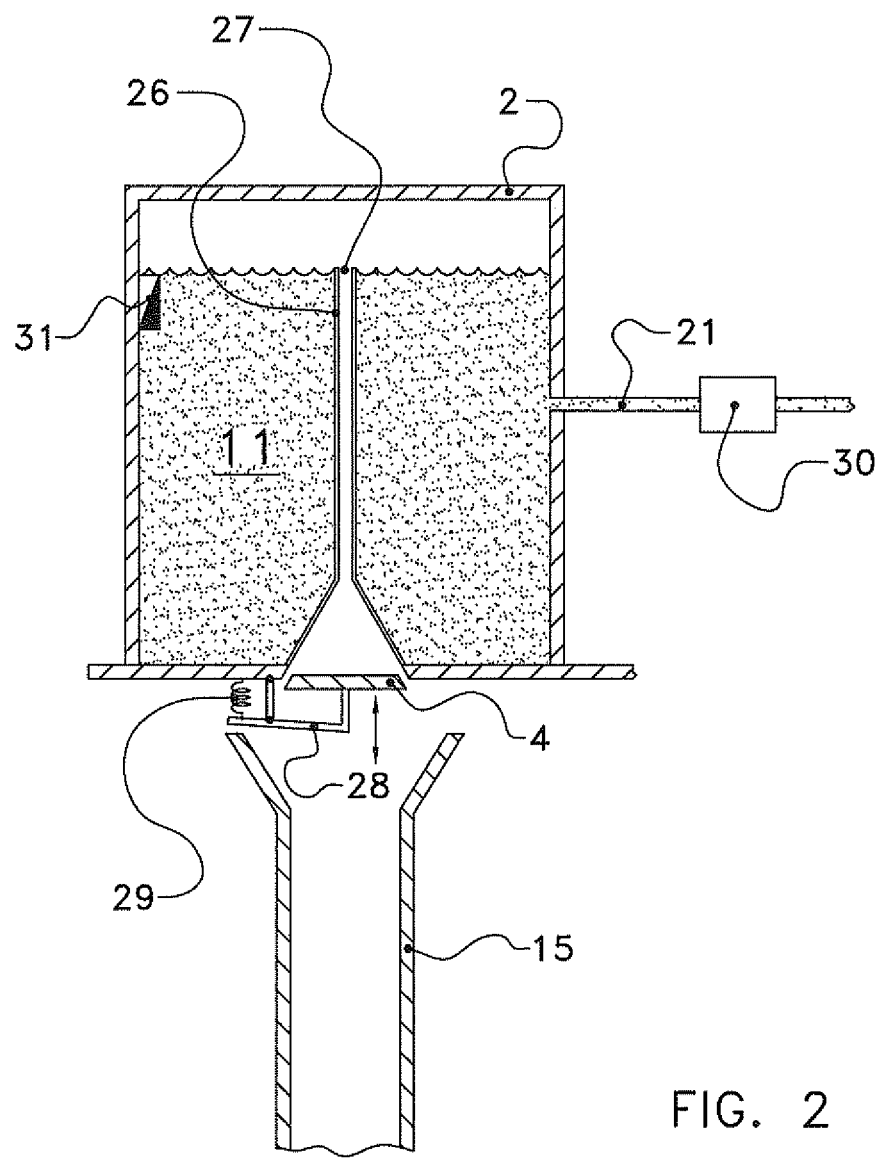
FIG. 2 shows a diagrammatic cross-section of a part of an alternative embodiment.

FIG. 2 is a diagrammatic cross-sectional view of a part of an alternative embodiment. Similar components are denoted here, as in the rest of the drawing, by the same reference numerals. Some components, such as heating means, have been omitted here for the sake of clarity.

In FIG. 2, the heating chamber 2 comprises an overflow tube 26 with a duct 27. The heating chamber 2 further comprises a valve 4 which may be controlled via a valve control 28 and a reset spring 29. A flow meter is denoted by 30 and a level meter by 31. The overflow tube 26 serves, on the one hand, to discharge the steam-cleaning liquid mixture, via the duct 27, and, on the other hand, subsequently to refill the heating chamber 2. If the chamber 2 is empty, cleaning liquid will be supplied again via the supply line 21, for example under the influence of gravitational force in a storage vessel or the like positioned at a higher level. This filling may continue until the level of the liquid 11 reaches the top of the overflow tube 26. In case of further supply, the cleaning liquid 11 will escape via the duct 27. This liquid may, for example, be used for post-rinsing and/or for cooling the cleaned teat cup 15. The level is adjustable by choosing the (relative) height of the overflow tube 26. By designing the tube 26 as a narrow one, this not fillable part of the chamber 2 can be very small. The interior of the tube may thus comprise part of the gas retention arrangement. Stopping the supply may take place under the action of a flow meter 30 in the supply line 21. There may also be used a level meter 31 which may be designed, for example, as a conductivity meter, a temperature meter, etc. Such arrangements may of course also be provided in the embodiment of FIG. 1.

In a preferred embodiment, the level meter 31 may be disposed at the outer side of the heating chamber 2, for example as a temperature meter, so that it is less or not hindered by calcium deposit, steam erosion and the like. Moreover, it is pointed out here that in fact the entire heating chamber may be free of electrically or electronically controlled valves and the like, as will be set out hereinafter in further detail.

The valve 4 is not only a safety valve that opens when the pressure in the chamber 2 becomes too high for any reason whatsoever. Moreover, this valve may be controlled with the aid of a valve control 28 in such a way that it will open in a desired manner and at a desired point of time. Advantageously, the valve control 28 is controllable by pressing against it by means of a teat cup 15. It will then be possible for the valve 4 to move in the direction of the arrow and to open. The reset spring 29 keeps the valve 4 closed in the inoperative position. Other embodiments of such a valve 4 are conceivable, such as provided with springs, sliding means, levers and the like.

It should be noted that the time required for cleaning and/or disinfecting the teat cup by means of the hot contents ejected from the heating chamber may be used for refilling the chamber 2. It is also possible, of course, to withdraw the cup 15 from the device during some time. The chamber 2 then fills and will not overflow, because the valve 4 is then closed.

Figure 3:
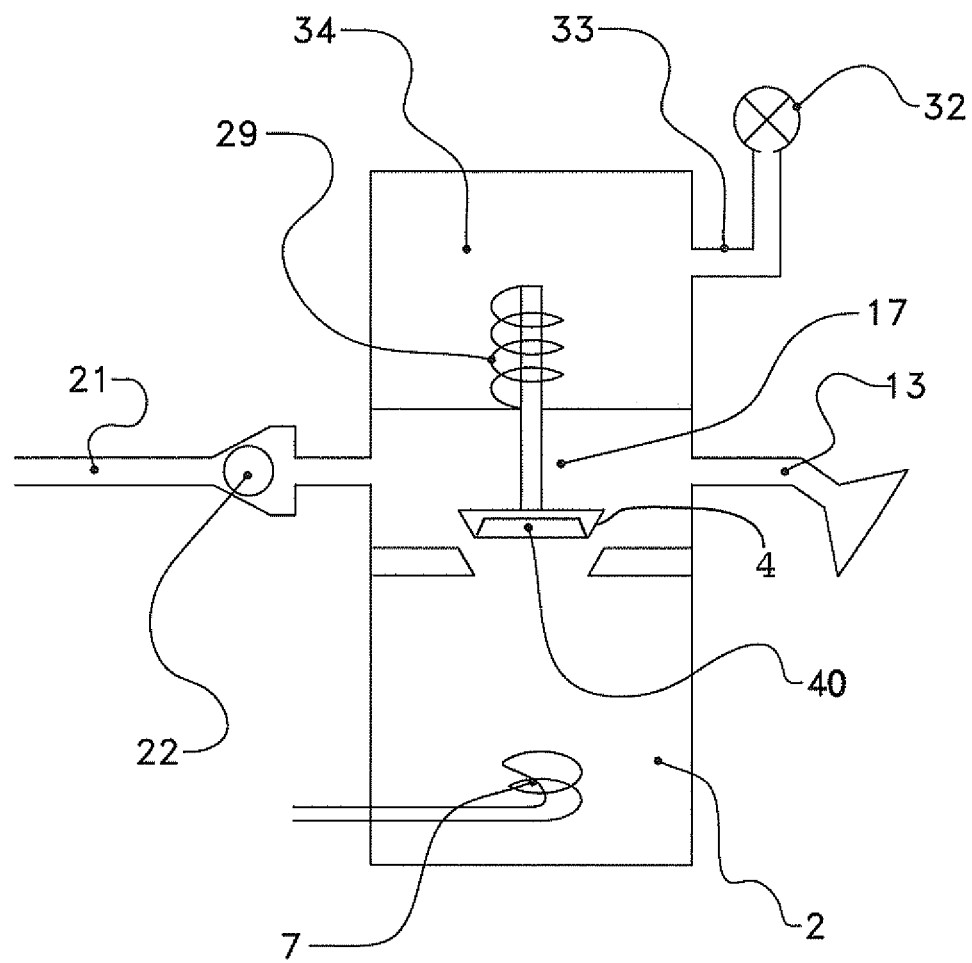
FIG. 3 shows a diagrammatic cross-section of another alternative embodiment.

FIG. 3 shows a diagrammatic cross-section of another alternative embodiment. Here, 21 is a supply line for liquid, such as cleaning liquid, which is closable by means of a non-return valve 22'. The supply line 21 is connected to the discharge 13 via a bypass 17.

Here, the valve 4 has been brought under pretension by means of a reset spring 29, and may further be operated by means of a pneumatic (or alternatively) hydraulic mechanism which comprises: a pump 32, a gas passage 33 and a pressure chamber 34. By means of this mechanism it is possible to operate the valve 4 in a quick and simple manner.

The valve 4 may also be provided in the heating chamber 2, and have in that case a floating action. By rinsing or cooling the device by means of liquid, the heating chamber 2 will be filled, in which case the float valve will rise until it closes the heating chamber.

The function of the bypass 17 is to prevent, in the case of cooling a teat cup by means of cool liquid flowing through, the liquid from flowing also through the heating chamber 2 and cooling the latter unnecessarily. For this purpose, the heating chamber 2 with the valve 4 may be closed. Since, however, the heating chamber should be filled again with (cleaning) liquid, it is, as an alternative, also possible to fill the heating chamber 2 with the rinsing liquid during rinsing/cooling. As soon as the heating chamber 2 has been filled, either the liquid flows by itself across the chamber 2, or the chamber 2 may be closed actively, such as by means of the valve 4.

In the embodiment of FIG. 3, a gas retention arrangement may be provided in the form of a cavity 40 in the underside of the valve 4. Such a cavity 40 may retain the required amount of air or vapor on closing the valve 4. It is however also understood that in the embodiment of FIG. 3, the valve 4 may be closed before the chamber 2 has filled completely in order to retain a greater quantity of gas.

The invention is not limited to the shown embodiments. The person skilled in the art will be aware of further modifications in addition to those described above that may be made to the structures and techniques described herein without departing from the spirit and scope of the invention. Accordingly, although specific embodiments have been described, these are examples only and are not limiting upon the scope of the invention.

What is claimed is:

1. Teat cup cleaning device comprising:
a pressurizable heating chamber configured to contain a superheated liquid, the pressurizable heating chamber having a discharge outlet and a valve, wherein the valve is configured to close the discharge outlet, and the discharge outlet releases directly into at least one teat cup;
a sealing edge for sealing the teat cup cleaning device onto the at least one teat cup
a filling device for filling the heating chamber with an amount of cleaning liquid;
a gas retention arrangement for maintaining a predetermined quantity of gas within the heating chamber on filling the heating chamber with the amount of cleaning liquid;
a valve controlling element, arranged to open the valve; and
a heating arrangement for heating the contents of the heating chamber to a predetermined condition having a temperature T higher than a boiling point Tk of the cleaning liquid at ambient pressure such that the liquid is superheated liquid upon opening of the valve of the heating arrangement; wherein valve when opened releases at least the superheated liquid via the discharge outlet into the teat cup.

2. Teat cup cleaning device according to claim 1, wherein the gas retention arrangement is arranged to ensure that between 3% and 90% by volume of gas is retained within chamber when initially filled and prior to heating.

3. Teat cup cleaning device according to claim 1, wherein the filling device comprises a supply line that is connected to the discharge outlet.

4. Teat cup cleaning device according to claim 1, wherein the temperature T amounts to at least 160° C.

5. Teat cup cleaning device according to claim 1, wherein the valve comprises a pressure-relief valve.

6. Teat cup cleaning device according to claim 5, wherein the valve controlling element is arranged to open the valve at an overpressure OD of at least 8 bar absolute pressure.

7. Teat cup cleaning device according to claim 1, wherein the valve controlling element is arranged to open the valve at an adjustable overpressure OD in the heating chamber.

8. Teat cup cleaning device according to claim 1, wherein the valve controlling element is arranged to open the valve at a predetermined temperature OT, in the heating chamber.

9. Teat cup cleaning device according to claim 1, wherein the filling device comprises a cleaning liquid storage container which is connectable to the heating chamber by a second valve.

10. Teat cup cleaning device according to claim 1, wherein the cleaning liquid is water.

11. Teat cup cleaning device according to claim 1, wherein the cleaning liquid comprises a disinfecting agent.

12. Teat cup cleaning device according to claim 1, wherein the heating arrangement has an adjustable heating power.

13. Teat cup cleaning device according to claim 1, wherein the heating arrangement comprises a control device arranged to control the heating arrangement in such a way that the predetermined condition is not reached until it is desired to discharge the cleaning liquid.

14. Teat cup cleaning device according claim 1, wherein the discharge outlet comprises a discharge duct projecting over a distance L beyond a wall of the chamber, wherein L is at most equal to the internal depth of the teat cup to be cleaned.

15. Teat cup cleaning device according to claim 1, wherein the valve is controlled by interaction with a teat cup to be cleaned.

16. Method of cleaning a teat cup, comprising:
providing a pressurizable heating chamber having a discharge outlet closable by a valve, the discharge outlet releasing directly into at least one teat cup;
sealing the heating chamber to the at least one teat cup;
supplying an amount of cleaning liquid to the pressurizable heating chamber sufficient to maintain a predetermined quantity of gas within the heating chamber;
closing the heating chamber;
heating the cleaning liquid in the heating chamber to a condition with a temperature T that is higher than a boiling point Tk of the cleaning liquid at ambient pressure such that cleaning liquid becomes a superheated liquid; and
opening the valve and directing the superheated liquid of the heating chamber via the discharge outlet into the at least one teat cup.

17. Method according to claim 16, wherein the predetermined quantity of gas is between 3% and 90% by volume of the chamber when initially filled and prior to heating.

18. Method according to claim 16, wherein between 10 ml and 25 ml of cleaning liquid is supplied to the heating chamber per teat cup.

19. Method according to claim 16, wherein the cleaning liquid is water.

20. Method according to claim 16, wherein the cleaning liquid comprises a disinfecting agent.

21. Method according to claim 16, wherein the valve is controlled to open at an adjustable threshold value of temperature, pressure or energy content within the chamber.

22. Method according to claim 21, wherein the threshold value is an overpressure OD in the heating chamber of at least 8 bar absolute pressure.

23. Method according to claim 21, wherein the threshold value is a temperature OT in the heating chamber of at least 160° C.

* * * * *